(12) United States Patent
Shintani

(10) Patent No.: US 10,447,923 B2
(45) Date of Patent: Oct. 15, 2019

(54) IMAGE PROCESSING APPARATUS, IMAGING APPARATUS, AND METHOD OF CONTROLLING IMAGE PROCESSING APPARATUS

(71) Applicant: CANON KABUSHIKI KAISHA, Tokyo (JP)

(72) Inventor: Takuya Shintani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/840,116

(22) Filed: Dec. 13, 2017

(65) Prior Publication Data

US 2018/0176463 A1    Jun. 21, 2018

(30) Foreign Application Priority Data

Dec. 21, 2016    (JP) ................. 2016-247921

(51) Int. Cl.
*H04N 5/232*    (2006.01)
*H04N 5/235*    (2006.01)
*H04N 5/243*    (2006.01)
*H04N 5/353*    (2011.01)
*H04N 5/14*    (2006.01)

(52) U.S. Cl.
CPC ......... *H04N 5/23222* (2013.01); *H04N 5/232* (2013.01); *H04N 5/2352* (2013.01); *H04N 5/2353* (2013.01); *H04N 5/2357* (2013.01); *H04N 5/23245* (2013.01); *H04N 5/23254* (2013.01); *H04N 5/23258* (2013.01); *H04N 5/23267* (2013.01); *H04N 5/23287* (2013.01); *H04N 5/23293* (2013.01); *H04N 5/23296* (2013.01); *H04N 5/243* (2013.01); *H04N 5/3532* (2013.01); *H04N 5/145* (2013.01)

(58) Field of Classification Search
CPC ............... H04N 5/23222; H04N 5/232; H04N 5/23258; H04N 5/3532; H04N 5/243; H04N 5/23287; H04N 5/23296; H04N 5/2357; H04N 5/2353; H04N 5/23267; H04N 5/23293; H04N 5/2352; H04N 5/23254; H04N 5/23245; H04N 5/145
See application file for complete search history.

(56) References Cited

U.S. PATENT DOCUMENTS 5,204,741 A * 4/1993 Sakaguchi ......... H04N 5/23248
                                                       348/208.6
9,756,258 B2    9/2017 Ariga
(Continued)

FOREIGN PATENT DOCUMENTS

JP    08-088855 A    4/1996
JP    2006-317848 A    11/2006
JP    2015-088917 A    5/2015

*Primary Examiner* — Nhan T Tran
(74) *Attorney, Agent, or Firm* — Cowan, Liebowitz & Latman, P.C.

(57) ABSTRACT

An imaging apparatus captures a first image with a first exposure time, captures a second image with a second exposure time shorter than the first exposure time, and determines either the first image and the second image as an image to be used for the calculation of a motion vector depending on a result of the detection of flicker based on the first image and the second image. Then, the imaging apparatus calculates a motion vector based on the determined image.

11 Claims, 19 Drawing Sheets

(56) References Cited

U.S. PATENT DOCUMENTS

| | | | |
|---|---|---|---|
| 2014/0153839 A1* | 6/2014 | Tsuzuki | H04N 5/2357 382/254 |
| 2015/0116537 A1* | 4/2015 | Ariga | H04N 5/2357 348/226.1 |
| 2017/0041542 A1* | 2/2017 | Ono | H04N 5/23254 |

* cited by examiner

FIG. 5A  FLICKER 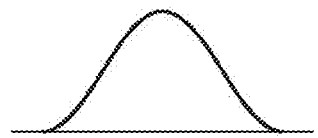
FIG. 5B  SHUTTER 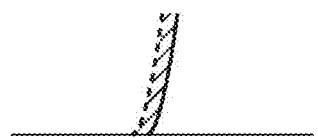

FIG. 6A  FLICKER 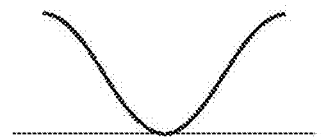
FIG. 6B  SHUTTER 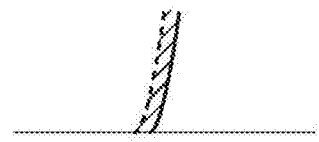

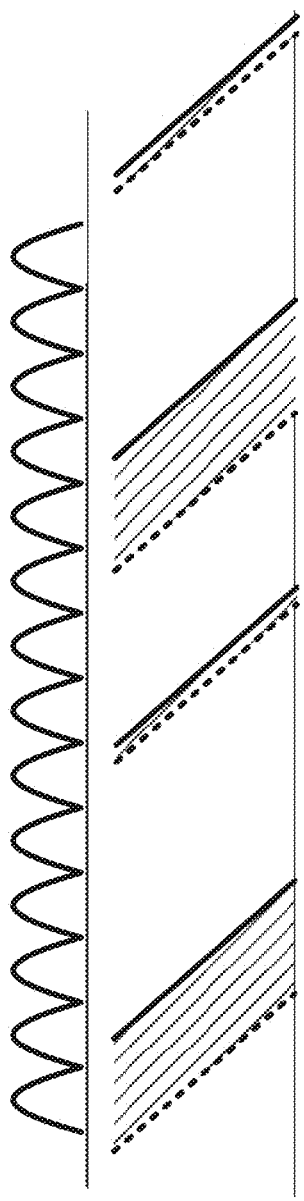
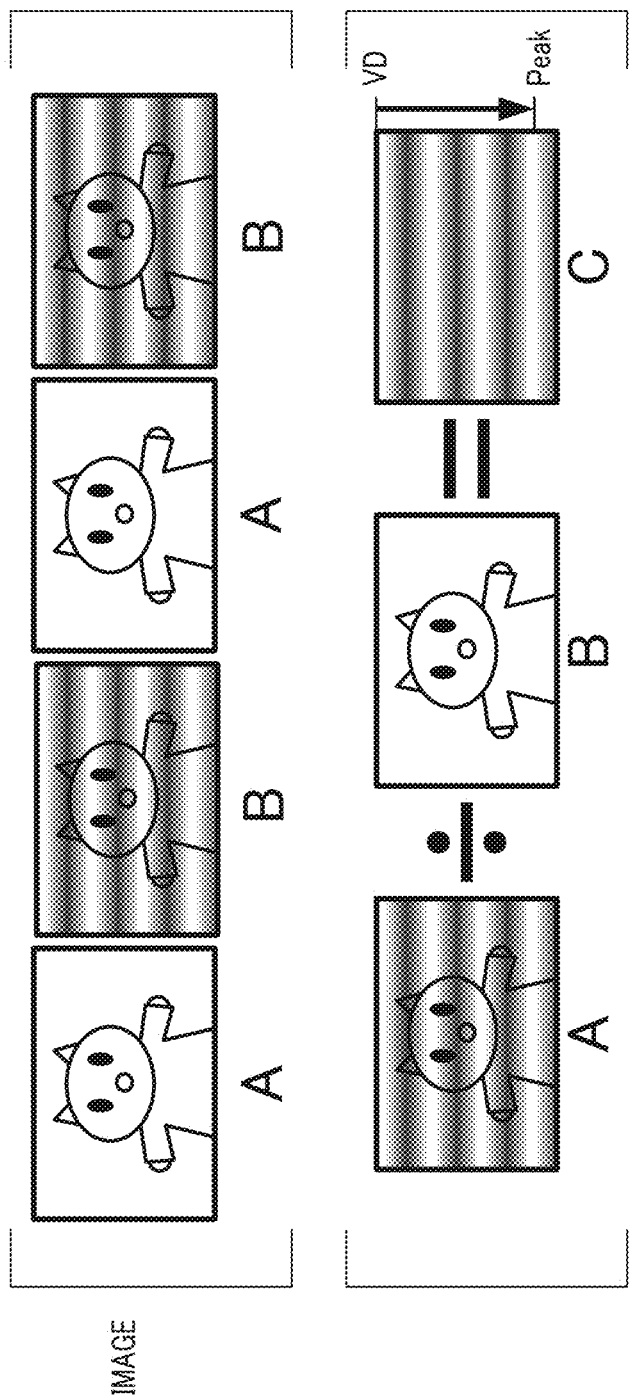
FIG. 7A FLICKER
FIG. 7B SHUTTER
FIG. 7C IMAGE
FIG. 7D

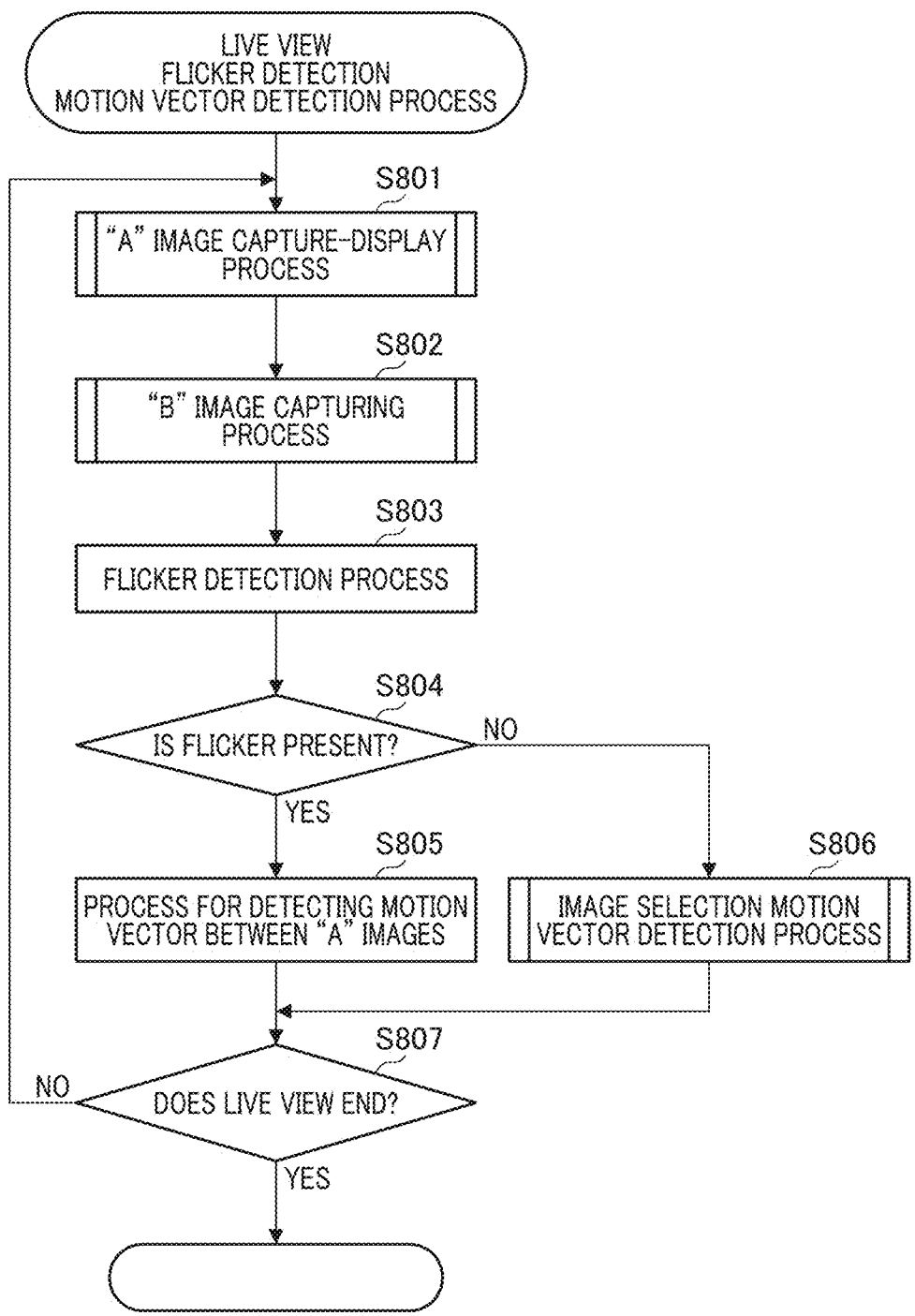

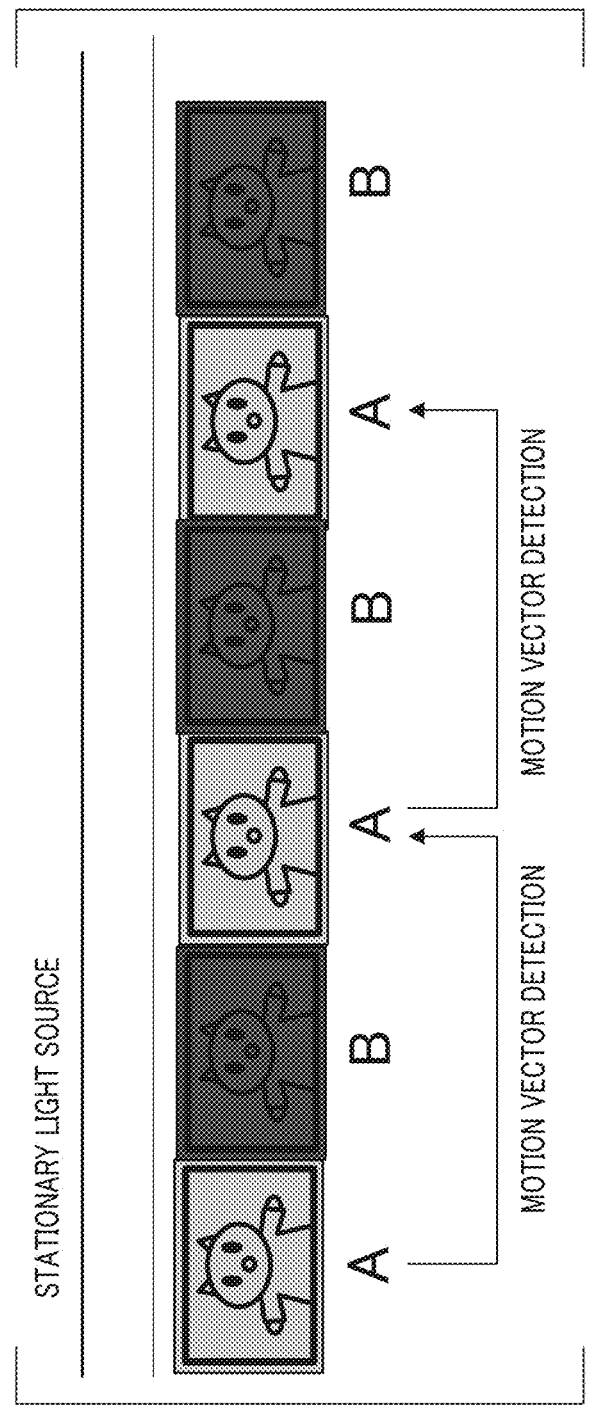

IMAGE PROCESSING APPARATUS, IMAGING APPARATUS, AND METHOD OF CONTROLLING IMAGE PROCESSING APPARATUS

BACKGROUND OF THE INVENTION

Field of the Invention

The present invention relates to an image processing apparatus, an imaging apparatus, and a control method of an image processing apparatus.

Description of the Related Art

A panning shot is a shooting technique expressing a sense of speed of a moving object. In the panning shot, a photographer performs panning of a camera in accordance with a movement of the object so as to freeze the object while making the background blurred. In the panning shot, the photographer needs to perform panning in accordance with the movement of the object. However, if the panning speed is too fast or too late, a difference occurs between a speed of the moving object and a panning speed, and as a result, not only the background but also the object is blurred in the captured image.

As a technique of assisting user's panning shot, a technique of absorbing the difference between the speed of the moving object and the panning speed by moving a shift lens has been proposed. For example, Japanese Patent Laid-Open No. 2006-317848 discloses a technique of detecting an object, calculating a correction amount for positioning the detected object at the center of the image, correcting the position of the object by moving an optical axis shift lens, and performing a panning shot. Japanese Patent Laid-Open No. 8-88855 discloses a technique of detecting a motion vector.

Additionally, with the increase in ISO of digital cameras, shooting at a high shutter speed is possible even under an artificial light source that includes flicker. If continuous shooting is performed at a high shutter speed under a flickering light source, variation of exposures for each frame is caused due to the change in light amount of an external light. Japanese Patent Laid-Open No. 2015-88917 discloses an imaging apparatus that captures both images with exposure unevenness and without exposure unevenness due to the flicker of the light source, and detects a timing at which the change in light amount of the flicker is small based on a change in brightness, thereby capturing an image with no variation of exposures for each frame.

In the technique disclosed in Japanese Patent Laid-Open No. 8-88855, sampling intervals of images that have been continuously shot are long at the time of detecting motion vectors, so if the movement of the object including blur is large with a small number of samplings in a fixed time, the moving amount of the object increases. Hence, unless a comparison region of a reference block and a candidate block in the continuous images is expanded, the motion vector detection cannot be performed accurately. Even with the increased number of samplings, if the flickering detection is performed by capturing an image with exposure unevenness and an image without exposure unevenness by controlling the exposure times, it is impossible to perform the detection of motion vectors accurately due to exposure unevenness between images under a flickering light source. Additionally, if the brightness of the object on which the motion vector detection is performed is extremely high or low, a highlight-detail loss or a blown-out highlight is caused on the image itself so that the comparison region of the main object for obtaining a motion vector becomes uniform. That is, if the main object is low in contrast, it is impossible to accurately perform detection of the motion vectors.

SUMMARY OF THE INVENTION

The present invention detects a motion vector accurately in accordance with a result of the detection of flicker based on the image captured with different exposure times.

An image processing apparatus according to an embodiment of the present invention comprises a memory; at least one processor, the processor executing the following functions in accordance with a program stored in the memory; an acquisition unit configured to acquire a first image captured with a first exposure rime and a second image captured with a second exposure time shorter than the first exposure time; a determination unit configured to determine either the first image or the second image as an image to be used for the calculation of a motion vector in accordance with a result of the detection of flicker based on the first image and the second image; and a calculation unit configured to calculate a motion vector based on the determined image.

Further features of the present invention will be described from the following description of the example description with reference to the attached drawings.

BRIEF DESCRIPTION OF THE DRAWINGS

FIGS. 5A to 5C illustrate a change in an amount of light of a flickering light source, a timing for pushing a shutter, and a still image.

FIGS. 6A to 6C illustrate a change in light amount of the flickering light source, a timing for pushing the shutter, and a still image.

FIGS. 7A to 7D are processes for detecting a timing at which a change in light amount of flicker is small.

FIG. 8 is a flowchart illustrating a process for detecting a motion vector.

FIG. 21 illustrates a process for detecting a motion vector between images.

DESCRIPTION OF THE EMBODIMENTS

First Embodiment

Figure 1:
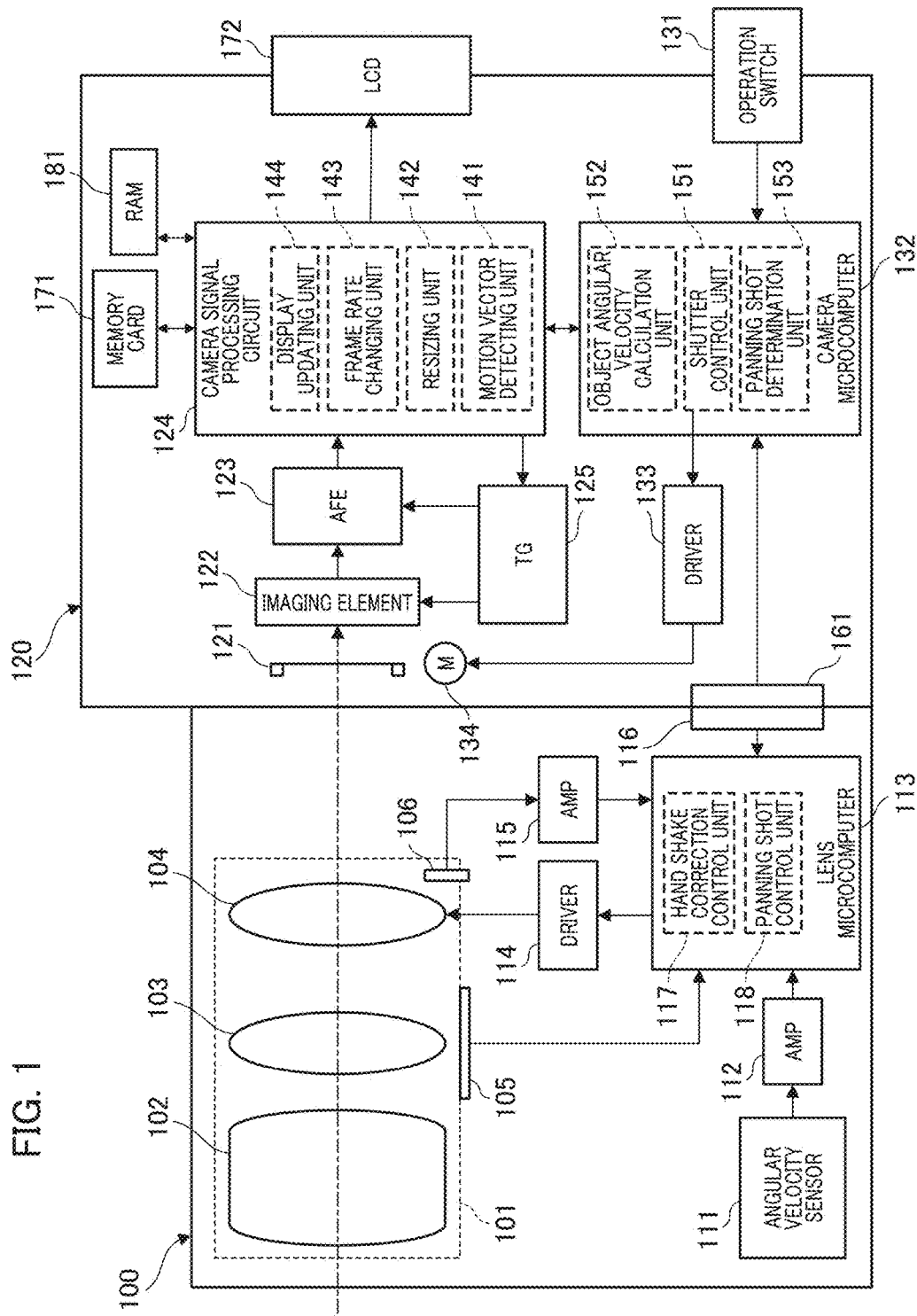
FIG. 1 illustrates a configuration of an image processing apparatus according to the present embodiment.

FIG. 1 illustrates a configuration of an image processing apparatus according to the present embodiment. In FIG. 1, as an example of the image processing apparatus, an imaging apparatus such as a digital camera including an interchangeable lens 100 and a camera body 120 will be described. The interchangeable lens 100 is attachable to and detachable from the camera body 120. Note that the present invention is also applicable to an imaging apparatus in which a lens and a camera body are integrally configured.

The interchangeable lens 100 includes a shooting lens unit 101. The shooting lens unit 101 has a main imaging optical system 102, a zoom lens group 103 that enables changing a focal length, and a shift lens group 104 that optically corrects an image blur with respect to an optical axis due to shaking applied to the imaging apparatus by moving in the perpendicular direction to the optical axis.

Additionally, the interchangeable lens 100 also includes a zoom encoder 105 that detects a position of a zoom lens group, a position sensor 106 that detects a position of the shift lens group, and an angular velocity sensor 111 that detects shaking of the imaging apparatus. Additionally, the interchangeable lens 100 includes an amplifier 112 that amplifies the output of the angular velocity sensor 111 and a lens system control microcomputer (hereinafter, referred to as "lens microcomputer") 113. Additionally, the interchangeable lens 100 also includes a driver 114 that drives the shift lens, an amplifier 115 that amplifies the output of the position sensor 106 of the shift lens, and a mount contact portion 116 connected to the camera body 120.

The lens microcomputer 113 controls the entire interchangeable lens 100. The lens microcomputer 113 includes a hand shake correction control unit 117 that performs hand shaking correction control and a panning shot control unit 118 that performs control for panning shot assistance. In addition to the above, although the lens microcomputer 113 also performs, for example, focus lens control and diaphragm control, these controls are omitted in FIG. 1 for simplicity of the explanation. Additionally, in order to correct a hand shake, the shaking is detected and corrected for two orthogonal axes, for example, the shaking in the horizontal direction and in the vertical direction. However, the configurations of the detection and the correction about the shaking in the horizontal direction and the vertical direction are the same, and thus, only one of the axes will be described in the present specification.

The camera body 120 includes a shutter 121, an imaging element 122 such as a CMOS sensor, an analog signal processing circuit 123, a camera signal processing circuit 124, a timing generator 125 that sets an operation timing of the imaging element 122, and the analog signal processing circuit 123. Additionally, the camera body 120 includes a camera operation switch 131 having a power switch, a release switch, and a switching switch that switches whether or not to set the panning assist mode and the like. Additionally, the camera body 120 includes a camera system control microcomputer (hereinafter, referred to as a "camera microcomputer") 132 that controls the entire camera system, a driver 133 that drives a motor for performing a shutter operation, and a shutter drive motor 134.

Additionally, the camera body 120 includes a memory card 171 that records video images that have been shot, a liquid crystal panel (hereinafter, referred to as an "LCD") 172 that monitors an image to be shot by the camera and displays images that have been shot, and a mount contact portion 161 connected to the interchangeable lens 100. The lens microcomputer 113 and the camera microcomputer 132 perform serial communication at a predetermined timing via the mount contact portions 116 and 161. The camera signal processing circuit 124 includes a motion vector detection unit 141, a resizing unit 142, a frame rate changing unit 143, and a display updating unit 144. The motion vector detection unit 141 detects a motion vector (performs motion vector detection) based on the shot images. In the present specification, the motion vector detection includes the detection of a motion vector and the calculation of its amount. The frame rate changing unit 143 changes the frame rate. The resizing unit 142 performs a process for resizing the shot image. The display updating unit 144 displays an image on the LCD 172. The camera microcomputer 132 is, for example, a processor, and controls the entire camera body 120. The camera microcomputer 132 includes a shutter control unit 151, an object angular velocity calculation unit 152 that calculates an angular velocity of the main object, and a panning shot determination unit 153.

In FIG. 1, if the power of the camera is turned on by the operation switch 131, the camera microcomputer 132 detects a change of the state, and power supply and initial setting to each circuit of the camera body 120 are performed by the control of the camera microcomputer 132. Additionally, the power is supplied to the interchangeable lens 100, and the initial setting in the interchangeable lens 100 is performed by the control of the lens microcomputer 113. Subsequently, communication starts at a predetermined timing between the lens microcomputer 113 and the camera microcomputer 132. In this communication, a state of the camera, a shooting setting, and the like are transmitted and received from the camera to the lens at a necessary timing. Additionally, lens focal length information, angular velocity information, and the like are transmitted and received from the lens to the camera at a necessary timing.

In the normal mode in which the panning shot assist mode setting is not performed, the angular velocity sensor 111 detects the shaking of the camera due to a hand shake and the like, in the interchangeable lens. Based on the detected result, the hand shake correction control unit 117 drives the shift lens group 104 and executes a hand shake correction operation. If the panning shot assist mode is set by the operation switch 131, the camera microcomputer 132 is switched to the panning shot assistance control. The information indicating that the control has been switched to the panning shot assist control is transmitted from the camera microcomputer 132 to the lens microcomputer 113, and the lens microcomputer 113 shifts to the panning shot assist mode.

The camera body 120 in which the panning assist mode is being set outputs a motion vector of the object detected by the motion vector detection unit 141 in the camera signal processing circuit 124 from the video image information captured at a constant frame rate. At the same time, the camera body 120 receives the camera angular velocity data detected by the angular velocity sensor in the interchangeable lens 100 from the lens microcomputer 113. Furthermore, the image data produced by a development process and the like being executed on the image information is temporarily output to a RAM 181, the display updating section 144 reads the image data in the RAM 181 at update intervals corresponding to synchronization signals and outputs the data to the LCD 172, and the update of the display of the live view image is performed.

If a photographer is performing a panning shot, there are two types of the motion vectors of the object detected and output by the motion vector detecting unit 141, that is, a vector corresponding to a main object to be shot by the photographer and a vector corresponding to a background being blurred. The vector corresponding to the background becomes almost equal to a moving amount on the image plane that is converted from the camera angular velocity data, and a motion vector of the main object is smaller in motion amount than the vector of the background, so that a motion vector of the main object (a moving amount of the main object on the image plane) can be specified.

In contrast, the camera angular velocity data received from the lens corresponds to a panning shot speed of the camera. Accordingly, if the difference between the camera angular velocity data that has been received and the angular velocity calculated from the moving amount of the main object on the image plane and the current focal length of the lens is calculated, the calculated result is the object angular velocity data of the main object to the camera. The camera microcomputer 132 transmits the calculated object angular velocity data of the main object to the lens microcomputer 113.

The panning shot determination unit 153 can integrate and hold the camera angular velocity data transmitted from the lens microcomputer 113. Additionally, the panning shot determination unit 153 can also reset the integrated data held at the predetermined timing. Thus, if the user performs a panning shot, at is possible to obtain a change of the camera angle with the predetermined timing to serve as a starting point (hereinafter, referred to as a "panning shot angle"). If the panning shot operation is performed by the photographer, the imaging apparatus according to the present embodiment assists the panning shot by correcting the amount corresponding to the difference between the camera angular velocity and the object angular velocity at the time of panning of the camera.

Figure 2:
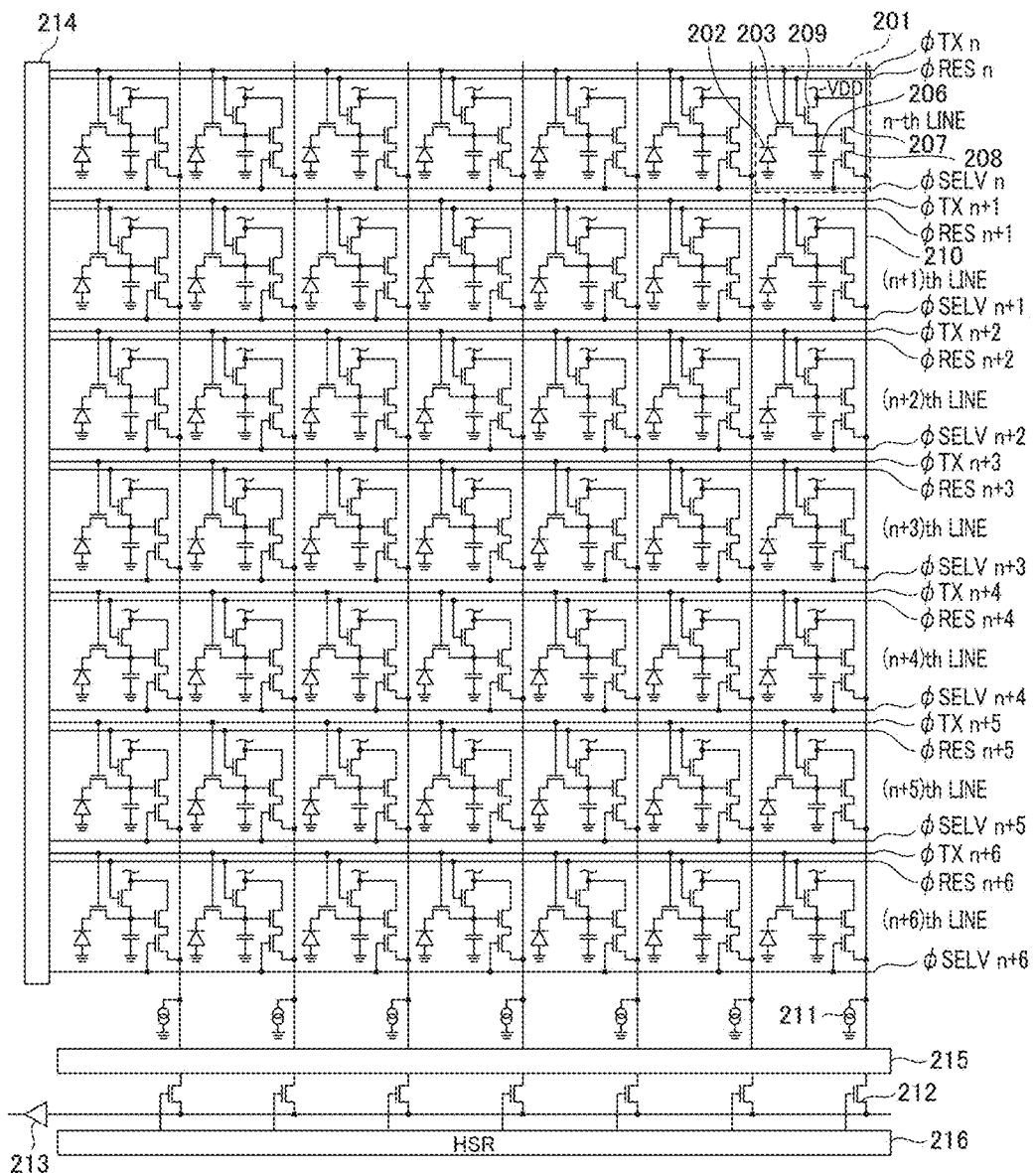
FIG. 2 is a configuration diagram of an imaging element provided in a camera body.

FIG. 2 is a configuration diagram of the imaging element 122 included in the camera body 120 in FIG. 1. The imaging element 122 employs a two-dimensional scanning method. In FIG. 2, a pixel 201 is one pixel, which is a unit of drive. A photodiode (PD) 202 converts lights into an electric charge. A floating diffusion (FD) 206 is a region for temporarily accumulating the electric charges. A transfer switch 203 transfers the charges generated in the PD 202 by a transfer pulse φTX to the FD 206. A MOS amplifier 207 functions as a source follower. A selection switch 208 selects a pixel by a selection pulse φSELV. A reset switch 209 removes the charges accumulated in the FD 206 by the reset pulse φRES.

A constant current source 211 serves as a load of the MOS amplifier 207. A readout circuit 215 converts the charges accumulated in the FD 206 of the pixels selected by the selection switch 208 into a voltage by charge-voltage conversion by the MOS amplifier 207 and the constant current source 211, and reads out it as pixel data via a signal output line 210. A selection switch 212 selects the pixel data (pixel signal) read out by the read circuit 215. The selection switch 212 is driven by a horizontal scanning circuit 216. The pixel data selected by the horizontal scanning circuit 216 is amplified by an output amplifier 213 and output from the imaging element 122. A vertical scanning circuit 214 selects the switches 203, 208, and 209.

Here, regarding each of φTX, φRES, and φSELV, the n-th scanning line that is scan-selected by using the vertical scanning circuit 214 uses "φTXn", "φRESn", "φSELVn", and the (n+1)th scanning line uses "φTXn+1", "φRESn+1", and "φSELVn+1". For convenience of explanation, FIG. 2 illustrates the n-th scanning line to the (n+6)th scanning line. Additionally, a floating diffusion amplifier is constituted by the FD 306, the MOS amplifier 307, and the constant current source 211.

Figure 3:
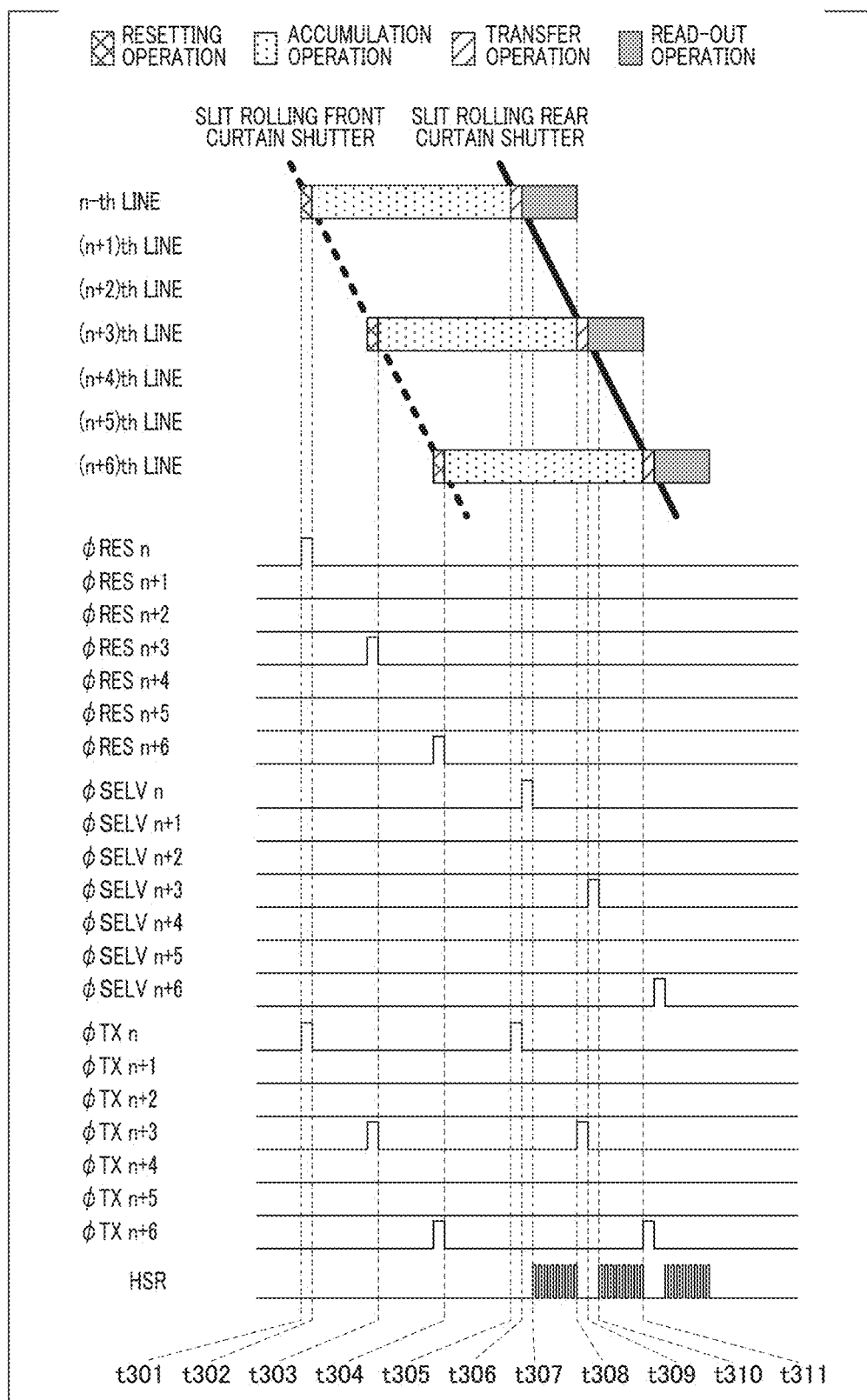
FIG. 3 illustrates a slit rolling shutter operation that controls an exposure amount of the imaging element.

FIG. 3 is a timing chart illustrating an operation of the imaging element that reads out the pixel data by performing control so as to have an appropriate exposure amount by using an electronic front curtain shutter and an electronic rear curtain shutter at the time of slit rolling shutter shooting. A description will be given of the slit rolling shutter operation that controls the exposure amount of the imaging element 122 with reference to FIG. 3.

In the operation of the electronic front curtain shutter, in the n-th line, first, pulses are applied to φRESn and φTXn during the period from time t301 to time t302 to turn on the transfer switch 203 and the reset switch 209. Hence, unnecessary charges accumulated in the PD 202 and the FD 206 of the n-th line are removed and a resetting operation is performed. Subsequently, at the time t302, the application of pulses to φRESn and φTXn is canceled to turn off the transfer switch 203 and the reset switch 209, and the accumulating operation of the charges generated in the PD 202 of the n-th line starts. Since the (n+1)th line and the (n+2)th line are not used as an image, no process is performed here. In the present embodiment, no process is performed on the (n+1)th line and the (n+2)th line. However, if it is taken into account that charges are accumulated in the PD to leak to the surrounding pixels, the charges of the PD 202 must always be reset by turning on φRESn and φTXn of the (n+1)th line and the (n+2)th line.

In a similar manner to the time t302, at time t303, the accumulating operation of the (n+3)th line starts, and at time t304, the accumulating operation of the (n+6)th line starts. In this manner, the electronic front shutter operation is realized by sequentially cancelling the resetting of the lines at regular intervals and starting the accumulating operation of the charges.

Here, the process returns to the n-th line, pulses are applied to φTXn during the period from time t305 to time t306 to turn on the transfer switch 203, and the transfer operation that transfers the charges accumulated in the PD 202 to the FD 206 is performed. Following the end of the transfer operation of the n-th line, pulses are applied to φSELVn during the period from time t306 to time t307 to turn on the selection switch 208, whereby the charges held in the FD 206 are converted into a voltage, and are output to the reading circuit 215 to serve as pixel data (pixel signal). The pixel data temporarily held by the reading circuit 215 is sequentially output from time t307 by the horizontal scanning circuit 216. Then, at time t308, the read-out of the pixel data from the pixels on the n-th line is completed.

In the (n+3)th line, pulses are applied to φTXn+3 during the period from the time t308 to time t309 to turn on the transfer switch 203, and the transfer operation that transfers the charges accumulated in the PD 202 to the FD 206 is performed. Following the end of the transfer operation of the (n+3)th line, pulses are applied to φSELVn+3 during the period from time t309 to time t310 to turn on the selection switch 208, whereby the charges held in the FD 206 is converted into a voltage and are output to the read-out circuit 215 to serve as pixel data. The pixel data temporarily held by the read-out circuit 215 is sequentially output from the time t310 by the horizontal scanning circuit 216. Subsequently, at time t311, the read-out of the pixel data from the pixels on the (n+3)th line is completed. As described above, in FIG. 3, the electronic rear curtain shutter is realized by performing the transfer and the read-out of charges at regular intervals. The period of time from the resetting to the transfer of charges the PD lines serves as a time for the exposure of each pixel.

Figure 4:
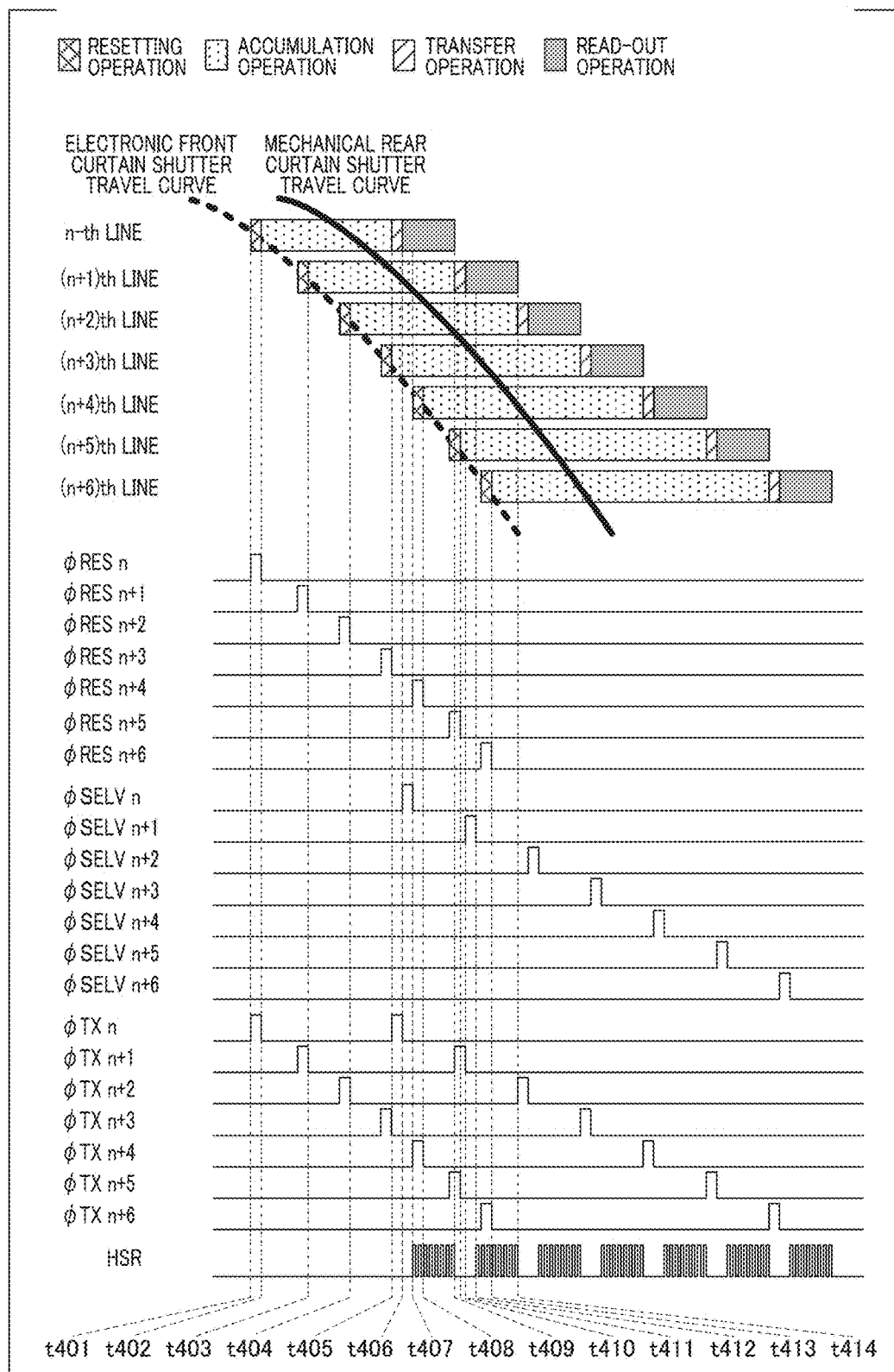
FIG. 4 illustrates an electronic front curtain shutter operation that controls the exposure amount of the imaging element.

FIG. 4 is a timing chart illustrating the operation of the imaging element that reads out the pixel data by performing control so as to have an appropriate exposure amount by using the electronic front curtain shutter and a mechanical rear curtain shutter at the time of the electronic front curtain shutter shooting.

With reference to FIG. 4, a description will be given of the electronic front curtain shutter operation that controls the exposure amount of the imaging element 122 by using the electronic front curtain shutter and the mechanical rear curtain shutter. In the operation of the electronic front curtain shutter, in the n-th line, first, pulses are applied to φRESn and φTXn during the period from time t401 to time t402 to turn on the transfer switch 203 and the reset switch 209. Accordingly, the unnecessary charges accumulated in the PD 202 and the FD 206 of the n-th line are removed and the resetting operation is performed. Subsequently, at the time t402, the application of pulses to φRESn and φTXn is canceled to turn off the transfer switch 203 and the reset switch 209, and the accumulating operation of the charges generated in the PD 202 of the n-th line starts. Similarly, the accumulating operation of the (n+1)th line starts at time t403, the accumulating operation of the (n+2)th line starts at time t404, the accumulating operation of the (n+3)th line starts at time t405, and the accumulating operation of the (n+4)th line starts at time t408.

Additionally, at time t410, the accumulating operation of the (n+5)th line starts, and at time t413, the accumulating operation of the (n+6)th line starts. In this manner, the electronic front curtain shutter operation is realized by sequentially canceling the resetting of the lines and starting the accumulating operation of the charges. Following this, the mechanical rear curtain shutter travels. The time between the electronic front curtain shutter and the mechanical rear curtain shutter serves as a time for exposure, and the resetting timing of the electronic front curtain shutter is controlled so as to have an appropriate exposure amount for each line.

The process returns to the n-th line, pulses are applied to φTXn during the period from time t405 to time t406 to turn on the transfer switch 203, and the transfer operation that transfers the charges accumulated in the PD 202 to the FD 206 is performed. Following the end of the transfer operation of the n-th line, pulses are applied to φSELVn during the period from time t406 to time t407 to turn on the selection switch 208, whereby the charges held in the FD 206 are converted into a voltage, and are output to the read-out circuit 215 to serve as pixel data (pixel signal). The pixel data temporarily held by the reading circuit 215 is sequentially output from time t407 by the horizontal scanning circuit 216. Subsequently, at time t409, the read-out of the pixel data from the pixels on the n-th line is completed.

On the (n+1)th line, pulses are applied to φTXn+1 during the period from time t409 to time t411 to turn on the transfer switch 203, and the transfer operation that transfers the charges accumulated in the PD 202 to the FD 206 is performed. Following the end of the transfer operation of the (n+1)th line, pulses are applied to φSELVn+1 during the period from time t411 to time t412 to turn on the selection switch 208, whereby the charges held in the FD 206 are converted into a voltage, and are output to the read-out circuit 215 to serve as pixel data. The pixel data temporarily held by the read-out circuit 215 is sequentially output by the horizontal scanning circuit 216 from time t412. Subsequently, at time t413, the read-out of the pixel data from the pixels on the (n+1)th line is completed.

FIGS. 5A to 5C and FIGS. 6A to 6C illustrate a change in light amount of the flickering light source, a timing at which the shutter is pushed, and a still image that is shot at that timing. In FIG. 4, the shutter moves from the top to the bottom along the scanning direction of the imaging element. However, in FIGS. 5A to 5C and FIGS. 6A to 6C, since the actual shutter travels from the bottom to the top of the camera, the shutter travels from the bottom to the top along this direction.

Figure 5C:
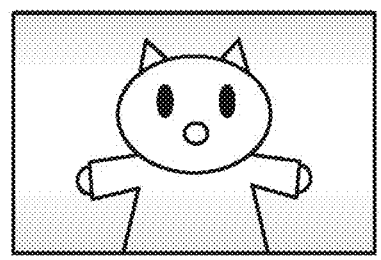
Figure 6C:
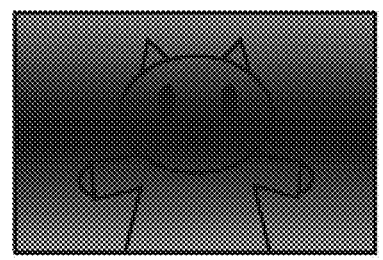

As shown in FIGS. 5A and 5B, if the shutter is pushed at the timing with the maximum amount of the light of the flicker, the image shown in FIG. 5C is shot. As shown in FIGS. 6A and 6B, if the shutter is pushed at the timing with the minimum amount of the light of the flicker, the image shown in FIG. 6C is shot.

FIGS. 7A to 7D illustrate a process for detecting a timing with a small change in the amount of light of the flicker. FIG. 7A illustrates the change in the amount of light of the flickering light source. FIG. 7B illustrates a timing at which the shutter is pressed. "A" in the drawing indicates an image without exposure unevenness for live view display (A image). Additionally, "B" in the drawing indicates an image with exposure unevenness for timing detection (B image).

The camera body 120 periodically acquires an image for normal live view display in which the exposure unevenness due to flicker does not occur by controlling the exposure time. Then, the live view display is realized by the camera body 120 realizes by displaying the acquired image on the LCD 172. The exposure time is controlled so as to perform the accumulation at an integral multiple of a flickering cycle or to perform the accumulation for a time sufficiently longer than the flickering cycle. Thereby, the occurrence of the exposure unevenness due to flicker can be prevented.

In contrast, as shown in FIG. 7C, the camera microcomputer 132 of the camera body 120 alternately shoots the A image for live view display and the B image for flickering detection. That is, the camera microcomputer 132 functions as an imaging means that captures the first image (A image) with a first exposure time and captures the second image (B image) with a second exposure time shorter than the first exposure time. At that time, the exposure time is controlled so as to intentionally acquire an image in which the exposure unevenness due to flicker has occurred. The camera body 120 does not display the image in which the exposure unevenness has occurred on the LCD 172. The exposure time at this time is controlled so that the exposure is performed with a time shorter than the flickering cycle. As a result, the exposure unevenness due to flicker can be generated intentionally.

The camera body 120 detects the flickering cycle and a timing at which the amount of light from the vertical synchronization signal (VD) becomes maximum based on the image with exposure unevenness due to flicker and the image without exposure unevenness due to flicker. FIG. 7D illustrates a calculation process for detecting flicker from the image with exposure unevenness and the image without exposure unevenness. The camera body 120 generates an image C in which only a flicker component is extracted from the image A and the image B by dividing the image A by the image B. Based on a fringe pattern of the image C obtained as above, in other words, the change in brightness of the image, the camera body 120 detects the flickering cycle and the timing with the maximum amount of light from VD, and detects a timing with a smaller change in the amount of light. In the case in which the camera is not under the flickering light source, the fringe pattern of the image C is not generated even in an exposure with a short time during which the exposure unevenness is intentionally generated, and as a result, it is possible to determine that imaging is not performed under the flickering light source.

If the flickering cycle and the timing with the maximum amount of light from VD are determined, the timing with a small change in the light amount of the flicker can be determined. Subsequently, based on the detected result, the camera body 120 captures an image at a timing with a small change in light amount. Thus, it is possible to obtain an image in which the influence on exposure due to flicker is suppressed.

FIG. 8 is a flowchart illustrating a detection process for a motion vector in the first embodiment. In step S801, the display updating unit 144 performs an A image capture-display process. The A image capture-display process will be described below with reference to the flowchart in FIG. 9. Subsequently, in step S802, the camera microcomputer 132 of the camera body 120 performs a B image capturing process. The B image capturing process will be described below with reference to the flowchart in FIG. 10.

Next, in step S803, the camera microcomputer 132 performs a flickering detection process. The flickering detection process is a process that detects the existence or nonexistence of flicker and its cycle peak from the A image and B image acquired in step S801 and step S802, and the detailed description thereof has been described as above. Subsequently, in step S804, the camera microcomputer 132 determines whether or not flicker exists, in other words, whether or not the shooting is performed under a flickering light source, based on the result of the flickering detection process in step S803. If flicker exists, the process proceeds to step S805. In step S805, the camera microcomputer 132 determines the A image as an image to be used for detecting a motion vector, and performs the process for detecting a motion vector between A images. The process for detecting a motion vector between A images performs the detection of a vector by using the A image captured last time and the A image that has been currently captured.

Figure 14:
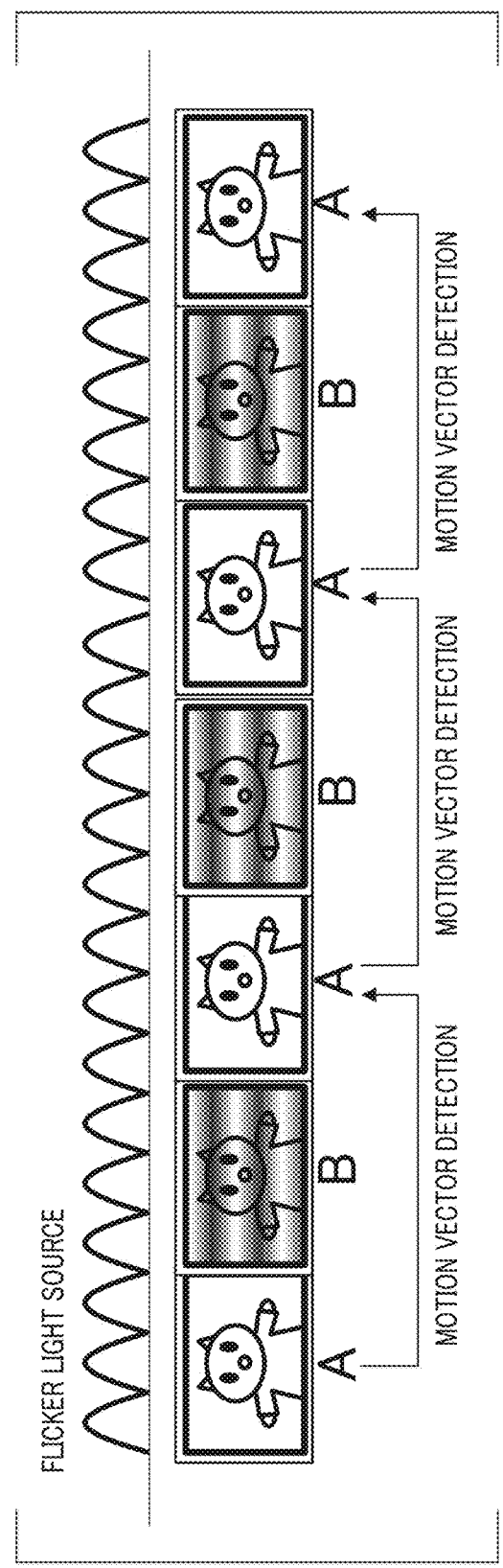
FIG. 14 illustrates a process at the time of performing the detection of a motion vector between A images.

FIG. 14 illustrates the process for detecting a motion vector between A images. If the camera is under the flickering light source, the B image becomes a fringe image, so that, in the motion vector detection between the A image and the B image, it is impossible to accurately detect the motion vector. Accordingly, the motion vector detection unit 141 detects a motion vector between the A images without fringe by controlling the camera microcomputer 124. As a result, it is possible to detect the motion vector accurately without being affected by the flickering light source.

The description will return to FIG. 8. In step S804, if the camera microcomputer 132 determines that no flicker exists, the process proceeds to step S806. In step S806, the motion vector detection unit 141 performs an image selecting motion vector detection process. The image selecting motion vector detection process will be described below with reference to the flowchart in FIG. 11. Subsequently, in step S807, the camera microcomputer 132 determines whether or not the live view ends. If the live view does not end, the process returns to step S801. If the live view ends, the process ends.

Figure 9:
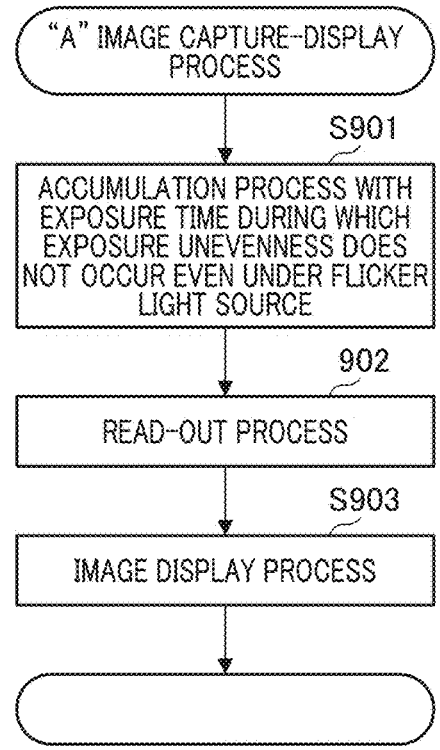
FIG. 9 is a flowchart illustrating an A image capture-display process.

FIG. 9 is a flowchart illustrating the A image capture-display process in step S801 of FIG. 8. First, in step S901, the camera microcomputer 132 performs the accumulation process for charges with an accumulation time during which exposure unevenness does not occur even under the flickering light source. The accumulation time during which exposure unevenness does not occur is a time that is an integer multiple of the flickering cycle or is a time that is sufficiently longer than the flickering cycle. Subsequently, in step S902, the camera microcomputer 132 performs a process for reading out images accumulated in step S901. The read-out images are held in the RAM 181 of FIG. 1.

Next, in step S903, the display updating unit 144 reads the image data in the RAM 181 at update intervals corresponding to the synchronization signal, outputs the data to the LCD 172, and performs a display update process for the live view image.

Figure 10:
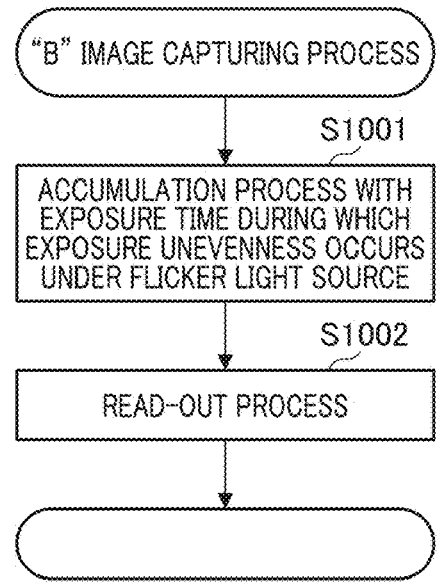
FIG. 10 is a flowchart illustrating a B image capture-display process.

FIG. 10 is a flowchart illustrating the B image capturing process in step S802 of FIG. 8. First, in step S1001, the camera microcomputer 132 performs an accumulation process for charges with an accumulation time during which exposure unevenness occurs under the flickering light source. The control of the exposure time at this time is performed with a time shorter than the flickering cycle. Subsequently, in step S1002, the camera microcomputer 132 performs a process for reading out the images accumulated in step S1001. The read-out image is held in the RAM 181 in FIG. 1. The B image is not used for display in the present embodiment.

Figure 11:
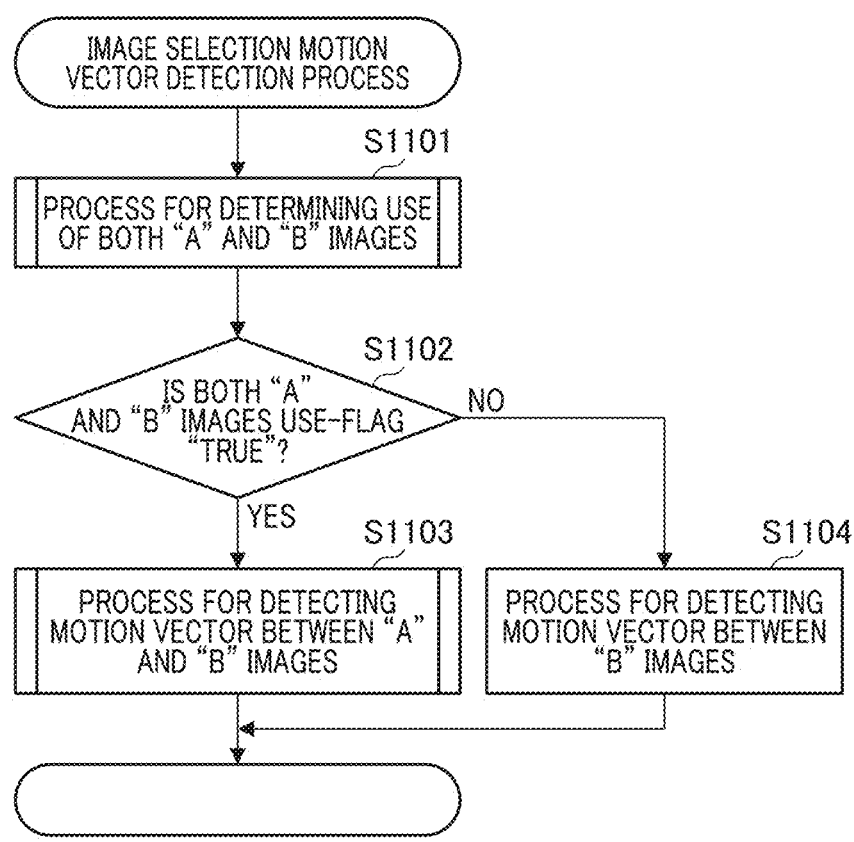
FIG. 11 is a flowchart illustrating a process for detecting an image selecting motion vector.

FIG. 11 is a flowchart illustrating the image selecting motion vector detection process in S806 of FIG. 8. First, in step S1101, the camera microcomputer 132 performs a process for determining the use of both A image and B image. The process for determining the use of both A image and B image will be described below with reference to the flowchart in FIG. 12. Subsequently, in step S1102, the camera microcomputer 132 determines whether or not a A and B images-use Flag held in the RAM 181 is set to TRUE. The A and B images-use Flag indicates whether or not the motion vector is detected by using both the A image and the B image.

If the A and B images-use Flag is set to TRUE, the process proceeds to step S1103. In step S1103, the camera microcomputer 132 performs a process for detecting a motion vector between the A images and the B images. The process for detecting a motion vector between A and B images will be described below with reference to the flowchart in FIG. 13.

If the A and B images-use Flag is not set to TRUE, the process proceeds to step S1104. In step S1104, the camera microcomputer 132 controls the motion vector detection unit 141 to perform the process for detecting a motion vector between B images. The process for detecting a motion vector between B images is to perform the vector detection by using the B image captured last time and the B image that has been captured this time.

Figure 15:
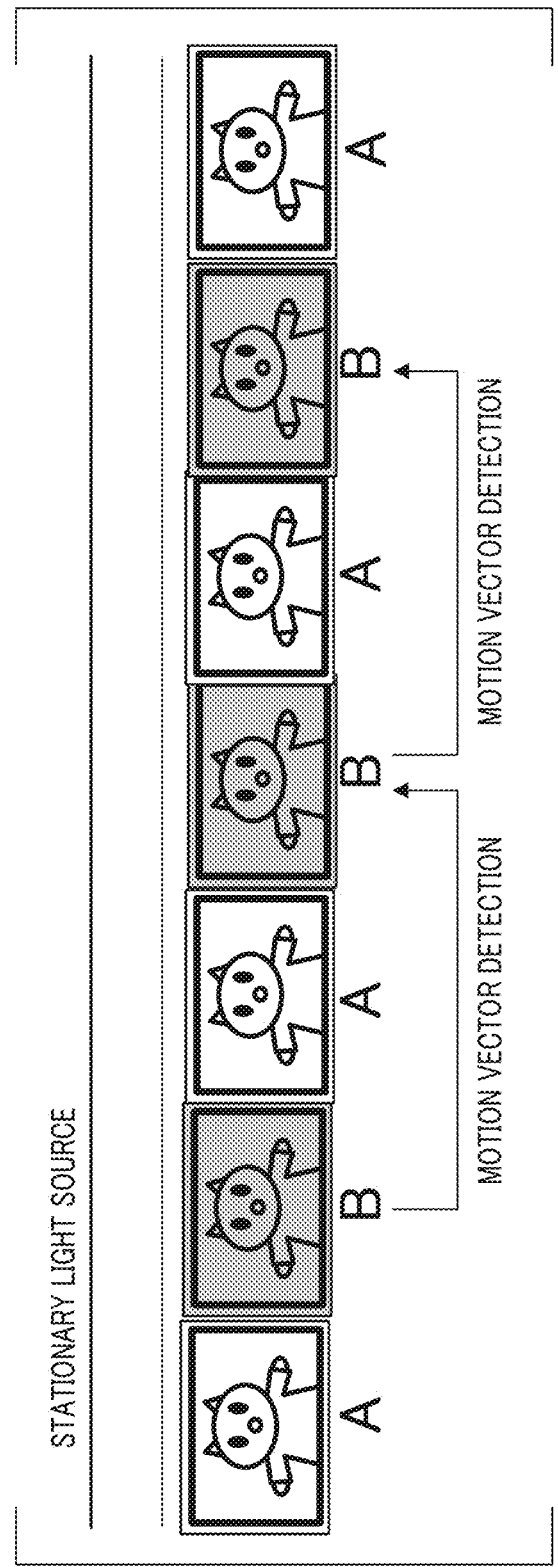
FIG. 15 illustrates a process at the time of performing the detection of a motion vector between B images.

FIG. 15 illustrates a process when a motion vector is detected between B images. Since it is determined in step S804 of FIG. 8 that no flicker exists, the B image does not become a fringe image. Additionally, in step S1102 of FIG. 11, the A and B images-use Flag is determined not to be TRUE. Under this condition, since the accumulation time of the B image is shorter than that of the A image, the image becomes dark. However the amount of shaking of the object is small, so that the motion vector detection can be accurately performed rather than performing the detection of the motion vector between the A images.

Figure 12:
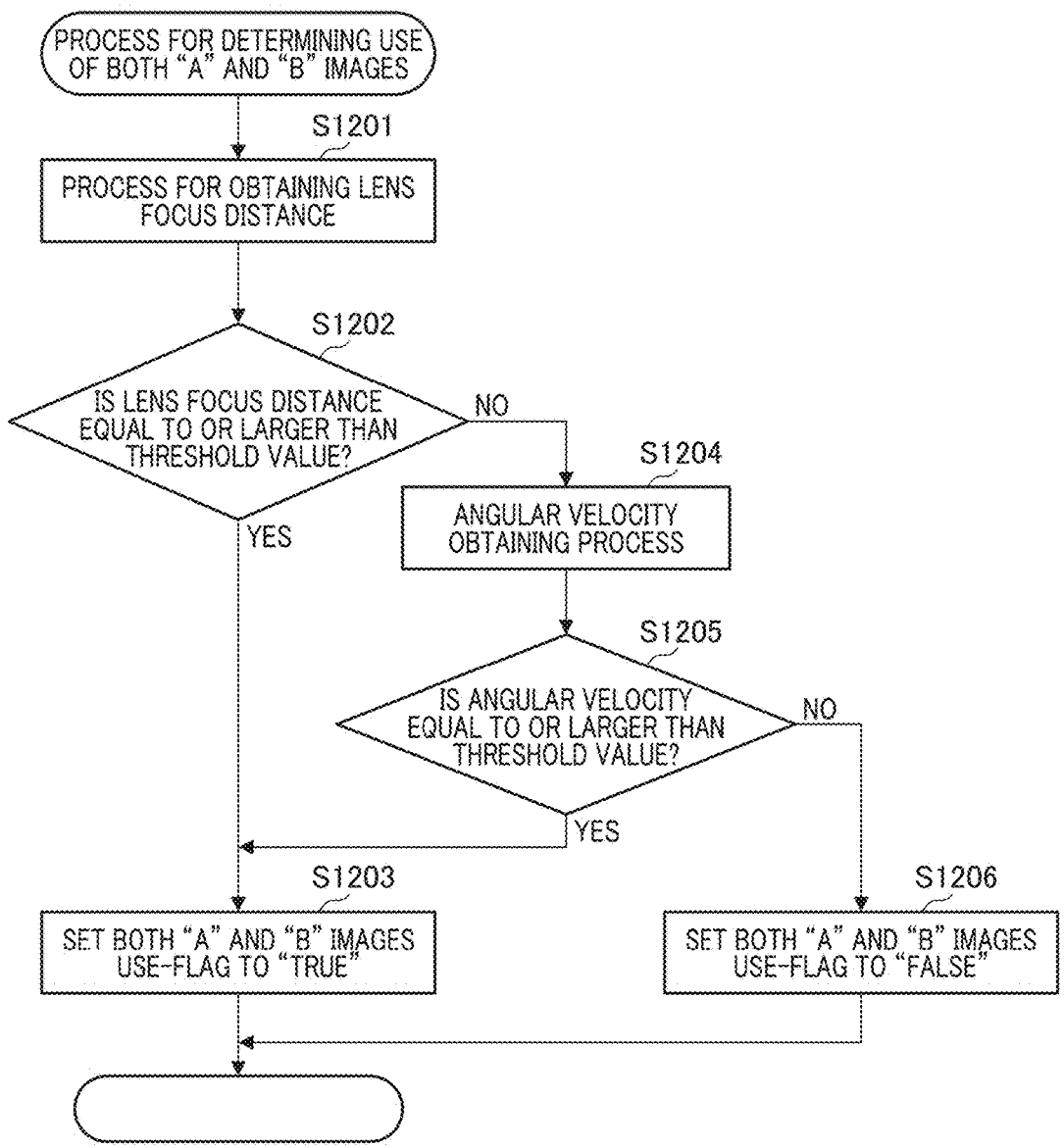
FIG. 12 is a flowchart illustrating a process for determining the use of both A and B images.

FIG. 12 is a flowchart illustrating a process for determining the use of both A and B images in step S1101 of FIG. 11. First, in step S1201, the camera microcomputer 132 obtains a focal length from the interchangeable lens 100. Subsequently, in step S1202, the camera microcomputer 132 determines whether or not the focal length is equal to or larger than the threshold value. If the focal length is equal to or larger than the threshold value, the process proceeds to step S1203. If the focal length is not equal to or larger than the threshold value, the process proceeds to step S1204.

In step S1203, the camera microcomputer 132 sets the A and B images-use Flag to TRUE. In the case of the long focal length, the moving distance on the image plane at the time of panning is longer than that of the lens with a short focal length, and the detection of the motion vector of the main object is performed with high frequency by using both the A image and the B image. As a result, it is possible to detect the motion vector related to the movement of the main object within a search region.

Additionally, in step S1204, the camera microcomputer 132 obtains angular velocity information from the interchangeable lens 100, and the process proceeds to step S1205. In step S1205, the camera microcomputer 132 determines whether or not the angular velocity is equal to or larger than the threshold value. If the angular velocity is equal to or larger than the threshold value, the process proceeds to step S1203. Specifically, since the angular velocity, that is, the panning speed of the camera, is fast, the camera microcomputer 132 determines that the user is about to perform a panning shot of the object. Then, in step S1203, the A and B images-use Flag is set to TRUE. If the angular velocity is not equal to or larger than the threshold value, the process proceeds to step S1206. In step S1206, the camera microcomputer 132 sets the A and B images-use Flag to FALSE, and the process ends.

Figure 13:
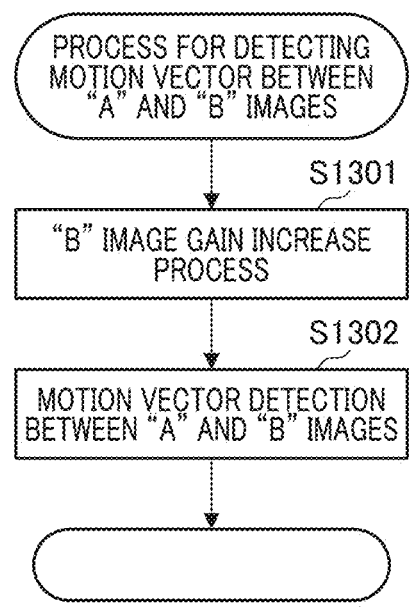
FIG. 13 is a flowchart illustrating a process for detecting a motion vector between A and B images.

FIG. 13 is a flowchart illustrating the process for detecting a motion vector between A image and B image in S1103 of FIG. 11. In step S1301, the camera microcomputer 132 controls the camera signal processing circuit 124 so as to perform a gain increase process for the B image. Since the accumulation time of the B image is shorter than that of the image, the image becomes dark. Due to such a difference in brightness and darkness, if the detection of the motion vector of the moving object is performed from continuous A and B images with different brightnesses, the correct detection of the motion vector cannot be performed. Therefore, the camera signal processing circuit 124 performs a gain increase process corresponding to the accumulation time to the B image so as to have the same brightness between the B image and the A image.

Next, in step S1302, the motion vector detection unit 141 performs the process for detecting a motion vector between A and B images. The process for detecting a motion vector between A and B images is to perform a motion vector detection process based on the A image and the B image that have been continuously captured. Specifically, the motion vector detection unit 141 performs the motion vector detection by using the A image and the B image that has been captured immediately after the A image and undergone the gain increase process in step S1301.

Figure 16:
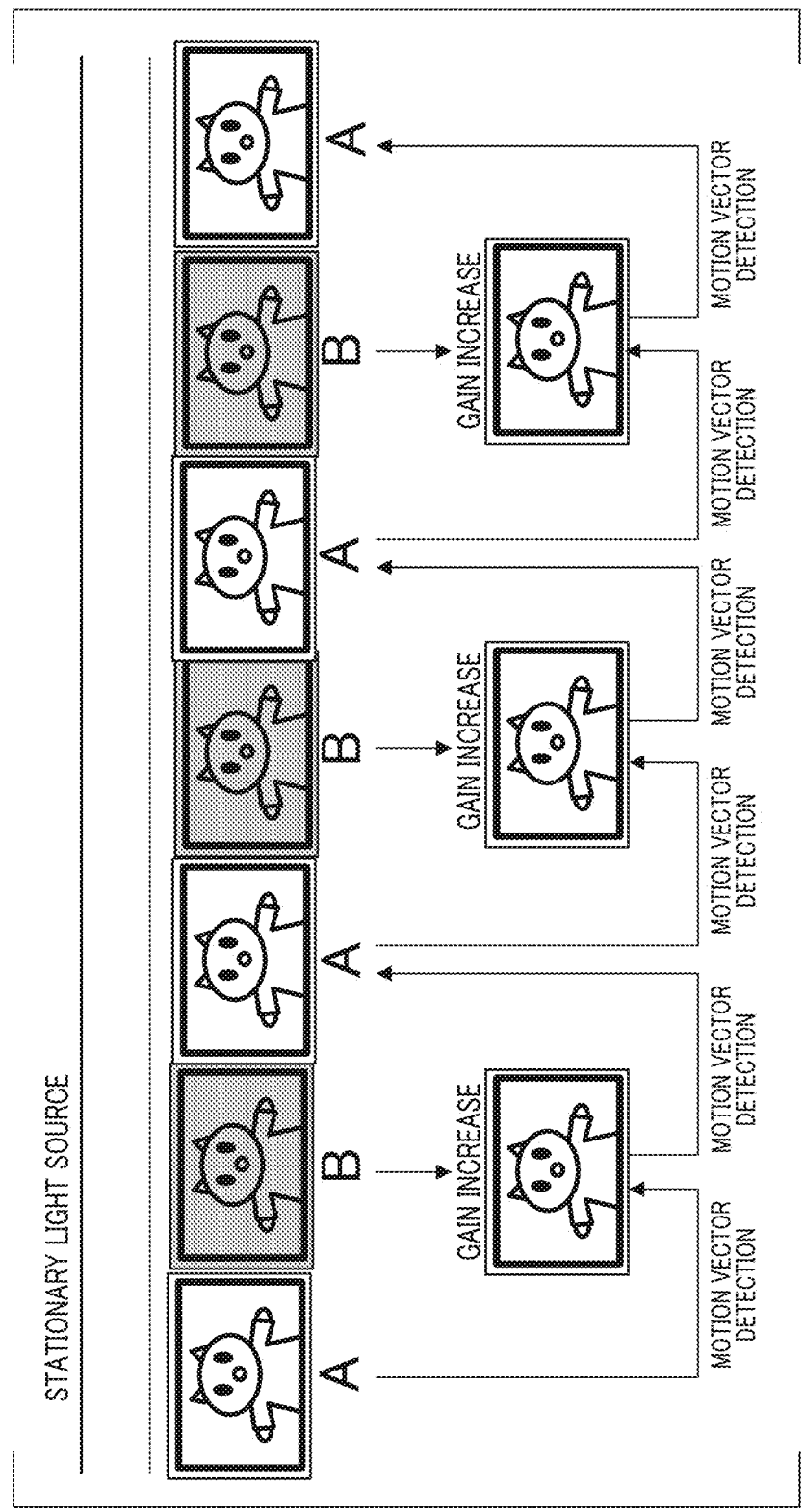
FIG. 16 illustrates a process at the time of performing the detection of a motion vector between A and B images.

FIG. 16 illustrates a process at the time of performing the detection or a motion vector between the A and B images. Since the shooting is not performed under the flickering light source, the B image does not become a fringe image. Additionally, in step S1102 of FIG. 11, the A and B images-use Flag is set to TRUE. Under this condition, motion vectors can be accurately detected by detecting a motion vector of the main object with high frequency by using both the A and B images.

As described above, according to the first embodiment, an image to be used for the detection of a motion vector is determined in accordance with a result of a determination of the existence or nonexistence of flicker based on an image with exposure unevenness and an image without exposure unevenness. Therefore, it is possible to accurately perform the motion vector detection under any conditions of a normal light source or a flickering light source.

Second Embodiment

A flowchart of the motion vector detection process in the second embodiment is the same as the flowchart shown in FIG. 8. Hereinafter, the image selecting motion vector detection process in step S806 of FIG. 8, which is different from the first embodiment, will be described.

Figure 17:
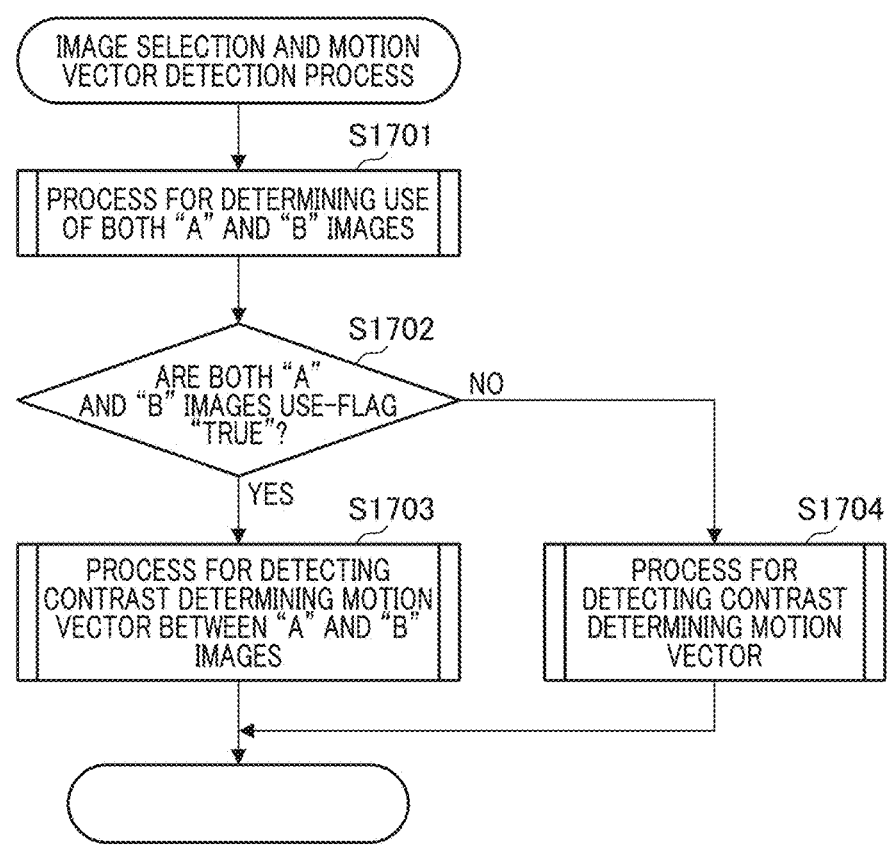
FIG. 17 is a flowchart illustrating a process for detecting an image selecting motion vector.

FIG. 17 is a flowchart illustrating the image selecting motion vector detection process in the second embodiment. Steps S1701 and S1702 are similar to steps S1101 and S1102 in FIG. 11. In step S1703, the camera microcomputer 132 performs a process for detecting a contrast determining motion vector between A and B images. The process for detecting a contrast determining motion vector between A and B images will be described below with reference to the flowchart in FIG. 18. In step S1704, the camera microcomputer 132 performs the process for detecting a contrast determining motion vector. The process for detecting a contrast determining motion vector will be described below with reference to the flowchart in FIG. 19.

Figure 18:
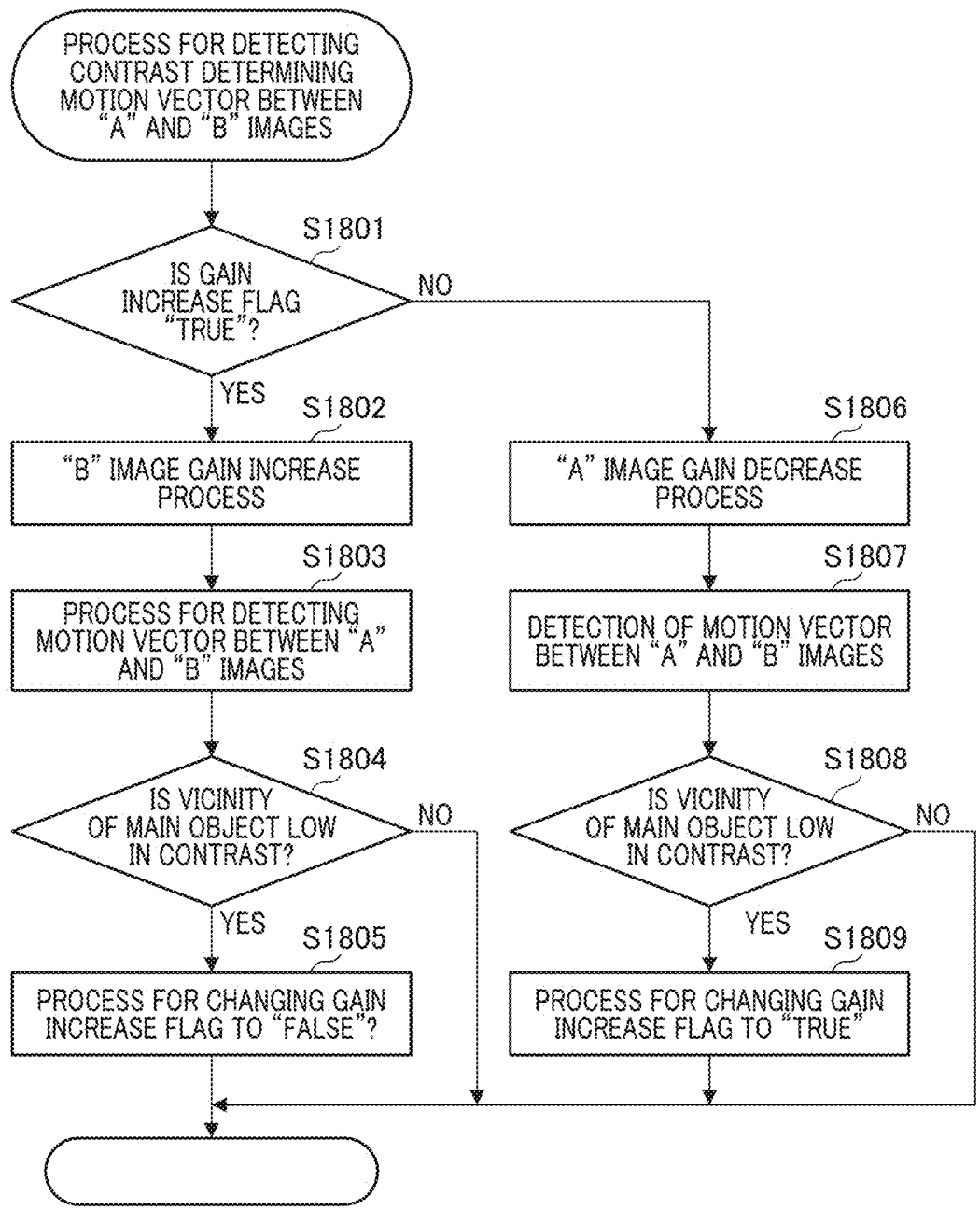
FIG. 18 illustrates a process for detecting a contrast determining motion vector between A and B images.

FIG. 18 is a flowchart illustrating the process for detecting a contrast determining motion vector between A and B images, in step S1703 of FIG. 17. In step S1801, the camera microcomputer 132 determines whether or not a gain increase Flag stored in the RAM 181 is set to TRUE. The gain increase Flag indicates whether or not the image gain increase process is to be performed. In the present embodiment, it is assumed that the gain increase Flag is set to TRUE as an initial value.

If the gain increase Flag is set to TRUE, the process proceeds to step S1802. In step S1802, the camera microcomputer 132 controls the camera signal processing circuit 124 to perform the gain increase process of the B image. The gain increase process of the B image is similar to the process (described with reference to FIG. 13.

Next, in step S1803, the camera microcomputer 132 performs the process for detecting a motion vector between A and B images. The process for detecting a motion vector between A and B images is similar to the process described with reference to FIGS. 13 and 16. Subsequently, in step S1804, the camera microcomputer 132 determines whether or not the main object or its vicinity is low in contrast. Specifically, the motion vector detection unit 141 outputs information indicating whether or not the main object or its vicinity is low in contrast with the result of detection of a motion vector and the camera microcomputer 132 determines whether or not the main object or its vicinity is low in contrast based on this information. The low contrast indicates that there are no sufficient contrasts to allow distinguishing the object in each comparison region of a reference block and a candidate block in a case where the detection of a motion vector for a highlight-detail loss image or a blocked up shadow image is performed.

If the main object or its vicinity is not low in contrast, the process ends. If the main object or its vicinity is low in contrast, the process proceeds to step S1805. Then, the camera microcomputer 132 changes the gain increase Flag to FALSE, and the process ends.

If it is determined in step S1801 that the gain increase Flag is not set to TRUE, the process proceeds to step S1806. In step S1806, the camera signal processing circuit 124 performs a gain decrease process of the A image. Since the accumulation time of the B image is shorter than that of the A image, the image becomes dark. Due to such a difference in brightness and darkness, if the detection of a motion vector of the moving object is performed from the continuous A and B images with different brightnesses, the correct detection of a motion vector cannot be performed. Therefore, a gain decrease process corresponding to the accumulation time of charges is performed so that the A image has the same brightness as the B image.

In step S1807, the motion vector detection unit 141 performs the process for detecting a motion vector between A and B images. The process for detecting a motion vector between A and B images performs the detection of a motion vector by using the B image, and the A image that has been captured immediately before the B image and undergone to the gain decrease process in step S1806.

Figure 20:
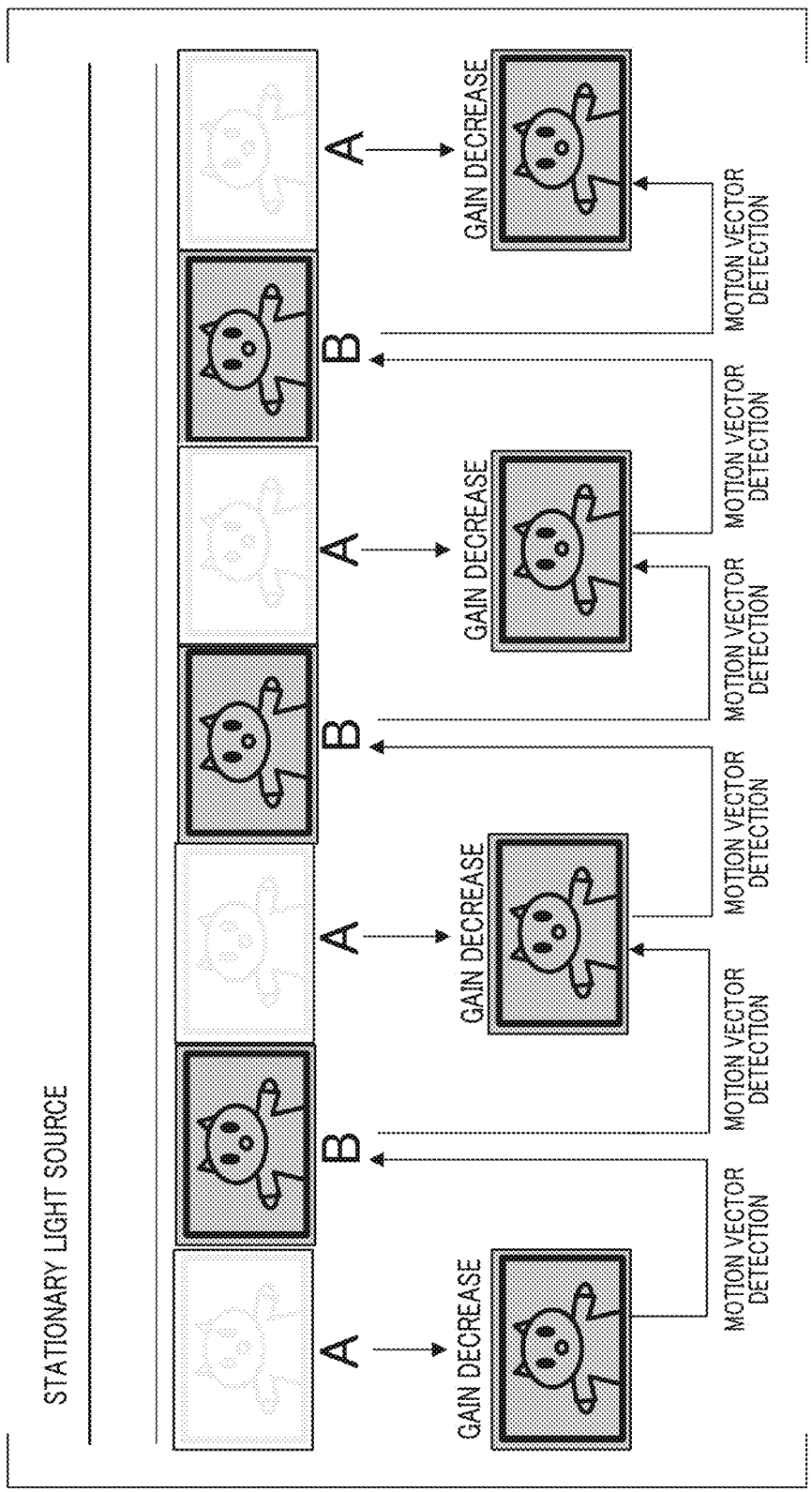
FIG. 20 illustrates a process for detecting a motion vector between A and B images.

FIG. 20 illustrates the process for detecting a motion vector between A and B images. Due to not being under the flickering light source, the B image does not become a fringe image. However, the process is performed in a case where the A image is determined to be low in contrast, so a highlight-detail loss occurs in the A image. Additionally, in step S1102 of FIG. 11, the A and B images-use Flag is set to TRUE. Under this condition, the accurate motion vector detection is possible by performing the detection of a motion vector of the main object with high frequency by using both the A image and the B image.

Next, in step S1808, the camera microcomputer 132 determines whether or not that the main object or its vicinity is low in contrast. If the main object or its vicinity is low in contrast, the process proceeds to step S1809. Then, the camera microcomputer 132 changes the gain increase Flag to TRUE, and the process ends. If it is not determined that the main object or its vicinity is low in contrast, the process ends.

Figure 19:
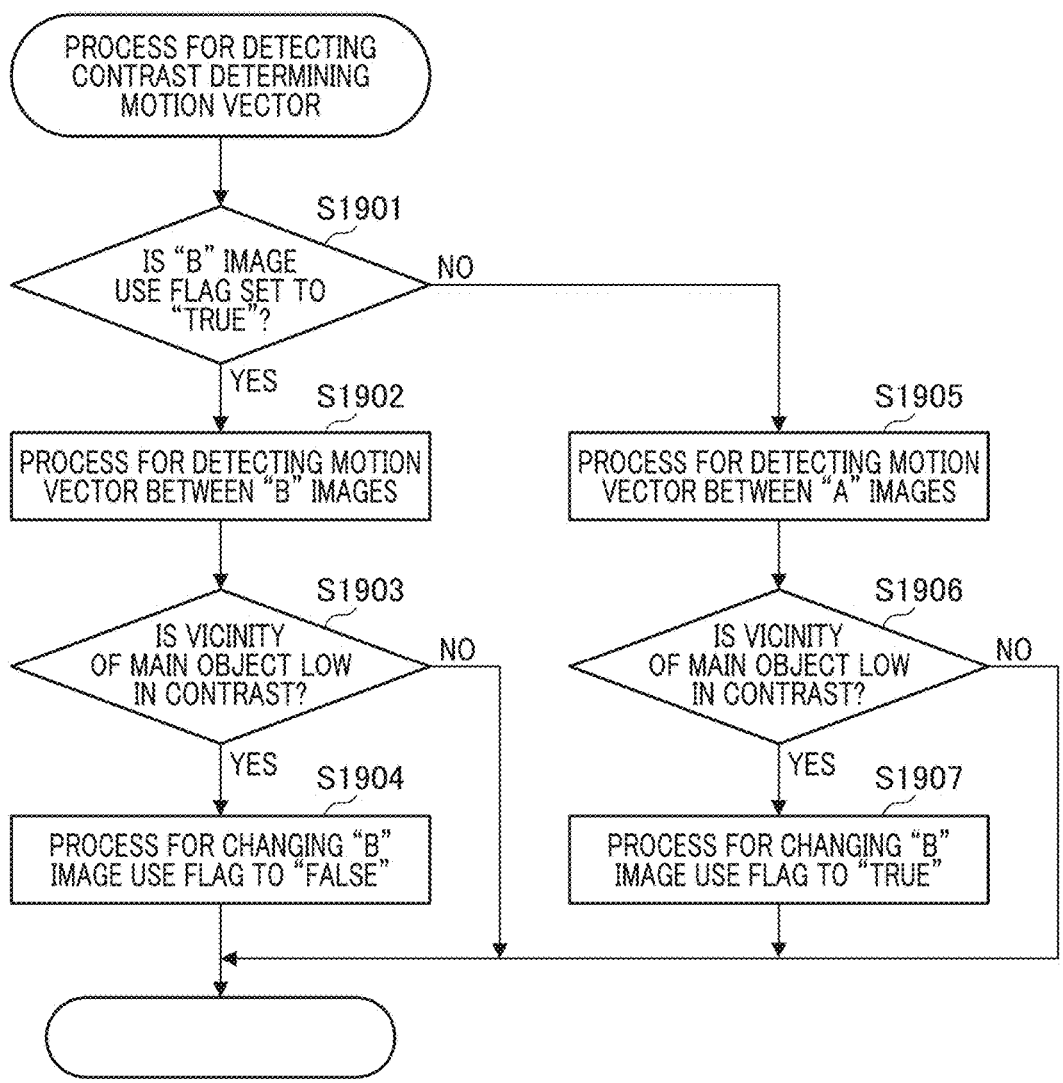
FIG. 19 illustrates a process for detecting a contrast determining motion vector.

FIG. 19 is a flowchart illustrating the process for detecting a contrast determination motion vector in step S1704 of FIG. 17. In step S1901, the camera microcomputer 132 determines whether or not the B image-use Flag stored in the RAM 181 is set to TRUE. The B image-use Flag indicates whether or not the motion vector detection is to be performed by using the B image. In the present embodiment, it is assumed that the B image-use Flag is set to TRUE to serve as an initial value.

If it is determined that the B image-use Flag is set to TRUE, the process proceeds to step S1902. In step S1902, the motion vector detection unit 141 performs a process for detecting a motion vector between B images. The process for detecting a motion vector between B images is similar to the process described with reference to FIGS. 11 and 15. Subsequently, in step S1903, the camera microcomputer 132 determines that the main object or its vicinity is low in contrast. This determination process is performed based on information indicating whether or not the contrast is low, which is output in the result of the process for detecting a motion vector between B images.

If the main object or its vicinity is not low in contrast, the process ends. If the main object or its vicinity is low in contrast, the process proceeds to step S1904. In step S1904, the camera microcomputer 132 changes the B image-use Flag to FALSE, and the process ends.

Additionally, in step S1901, if it is determined that the B image use Flag is not set to TRUE, the process proceeds to step S1905. In step S1905, the camera microcomputer 132 performs a process for detecting a motion vector between A images. The detection of a motion vector between A images is similar to the process described with reference to FIG. 8.

FIG. 21 illustrates a process for detecting a motion vector between A images in the second embodiment. Due to not being under the flickering light source, the B image does not become a fringe image. However, the process is performed if the B image is determined to be low in contrast, so a blocked up shadow occurs in the B image.

The description will return to FIG. 19. In step S1906, the camera microcomputer 132 determines whether or not the main object or its vicinity is low in contrast. This determination process is performed based on information indicating whether or not the contrast is low, which is output in the detection of a motion vector between A images.

If it is determined that the main object or its vicinity is not low in contrast, the process ends. If it is determined that the main object or its vicinity is low in contrast, the process proceeds to step S1907. In step S1907, the camera microcomputer 132 changes the B image-use Flag to TRUE, and the process ends.

As described above, according to the second embodiment, it is possible to select an image after determining the contrast and accurately detect the motion vector under both conditions of the normal light source and the flickering light source. Although the preferred embodiments of the present invention have been described above, the present invention is not limited to these embodiments, and various modifications and changes are possible within the scope of the gist thereof.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-247921, filed Dec. 21 2016, which is hereby incorporated by reference wherein in its entirety.

What is claimed is:

1. An image processing apparatus comprising:
   a memory;
   at least one processor, the processor executing the following functions in accordance with a program stored in the memory;
   an acquisition unit configured to acquire a first image captured with a first exposure time and a second image captured with a second exposure time shorter than the first exposure time;
   a determination unit configured to change either the first image or the second image as an image to be used for the calculation of a motion vector in accordance with a result of a detection of flicker based on the first image and the second image; and
   a calculation unit configured to calculate a motion vector based on said image.

2. The image processing apparatus according to claim 1, wherein the determination unit determines the first image as said image to be used for the calculation of the motion vector and does not determine the second image as said image to be used for the calculation of the motion vector, if the flicker is detected.

3. The image processing apparatus according to claim 1, wherein, if the flicker is not detected, the determination unit determines said image to be used for the calculation of the motion vector based on a focal length or an angular velocity indicating shaking applied to the image processing apparatus.

4. The image processing apparatus according to claim 3, wherein, if the focal length is equal to or larger than a threshold value in the case where the flicker is not detected, the determination unit determines the first image and the second image as images to be used for the calculation of the motion vector, and
   wherein, if the focal length is not equal to or larger than the threshold value and the angular velocity is not equal to or larger than a threshold value in the case where the flicker is not detected, the determination unit determines the second image as said image to be used for the calculation of the motion vector.

5. The image processing apparatus according to claim 4, wherein, even in a case where the focal length is not equal to or larger than the threshold value, if the angular velocity is equal to or larger than the threshold value, the determination unit determines the first image and the second image as images to be used for the calculation of the motion vector.

6. The image processing apparatus according to claim 1, wherein, if the first image and the second image are determined as images to be used for the calculation of the motion vector, the calculation unit increases a gain of the second image so that the first image and the second image have the same brightness, and calculates the motion vector.

7. The image processing apparatus according to claim 3, wherein, if the focal length is equal to or larger than a threshold value in a case where the flicker is not detected, the determination unit determines the first image and the second image as images to be used for the calculation of the motion vector, and
   wherein, if the focal length is not equal to or larger than the threshold value and the angular velocity is not equal to or larger than the threshold value in a case where the flicker is not detected, the determination unit determines either the first image or the second image as said image to be used for the calculation of the motion vector depending on a contrast of an object.

8. The processing apparatus according, to claim 7, wherein, if the angular velocity is equal to or larger than the threshold value even in a case where the focal length is not equal to or larger than the threshold value, the determination unit determines the first image and the second image as images to be used for the calculation of the motion vector.

9. The image processing apparatus according to claim 7, wherein, if the first image and the second image are determined as ages to be used for the calculation of the notion vector, the calculation unit increases a gain of the second image or decreases a gain of the first image so that the first image and the second image have the same brightness, depending on the contrast of an object, and calculates the motion vector.

10. An imaging apparatus comprising:
    a memory;
    at least one processor, the processor executing the following functions in accordance with a program stored in the memory;
    an acquisition unit configured to acquire a first image captured with a first exposure time and a second image captured with a second exposure time shorter than the first exposure time;
    a determination unit configured to change either the first image or the second image as an image to be used for the calculation of a motion vector, in accordance with a result of a detection of flicker based on the first image and the second image; a calculation unit configured to calculate a motion vector based on said image; and
    an image-capturing unit configured to alternately capture the first image and the second image;
    wherein, if the first image and the second image are used for the calculation of the motion vector, the calculation unit calculates the motion vector based on the first image and the second image that have been captured continuously.

11. A control method of an image processing apparatus comprising:
    acquiring a first image captured with a first exposure time and a second image captured with a second exposure time shorter than the first exposure time;
    changing either the first image or the second image as an image to be used for the calculation of a motion vector depending on a result of a detection of flicker based on the first image and the second image; and
    calculating the motion vector based on said image.

* * * * *